United States Patent [19]

Bowers

[11] 3,856,099
[45] Dec. 24, 1974

[54] SNOWMOBILE ADJUSTABLE SUSPENSION
[75] Inventor: Michael R. Bowers, Westminster, Calif.
[73] Assignee: Yamaha International Corporation, Buena Park, Calif.
[22] Filed: July 23, 1973
[21] Appl. No.: 381,805

[52] U.S. Cl. .................................. 180/5 R, 305/32
[51] Int. Cl. ........................................... B62m 27/02
[58] Field of Search............. 180/5 R, 9.52; 305/24, 305/25, 27, 32

[56] References Cited
UNITED STATES PATENTS

| 2,855,059 | 10/1958 | Sutherland | 305/32 X |
| 3,494,438 | 2/1970 | Rose | 180/5 R |
| 3,613,810 | 10/1971 | Hetteen | 180/5 R |
| 3,613,811 | 10/1971 | Brandli | 180/5 R |
| 3,653,453 | 4/1972 | Tiitola | 180/5 R |
| 3,773,126 | 11/1973 | Irvine | 180/5 R |

Primary Examiner—Philip Goodman
Attorney, Agent, or Firm—Lindenberg, Freilich, Wasserman, Rosen and Fernandez

[57] ABSTRACT

An adjustable mechanism for a snowmobile of the type wherein the chassis is supported on the track by rails which hold the track-tensioning wheels, including a vertical slot formed on each side of the chassis, bolts fixed to the upper end of a suspension shaft and extending through the slots, and a screw adjustor for raising and lowering the bolts along the slots. The adjustor permits any degree of vertical chassis adjustment while the track remains under tension, to permit weight transfer between the skis at the front of the chassis and the track.

4 Claims, 12 Drawing Figures

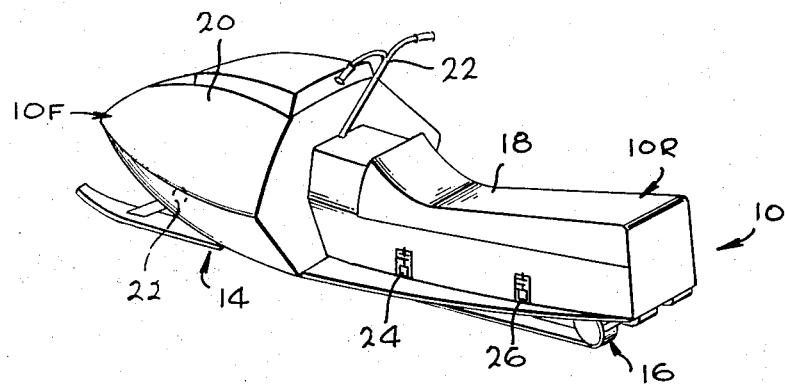
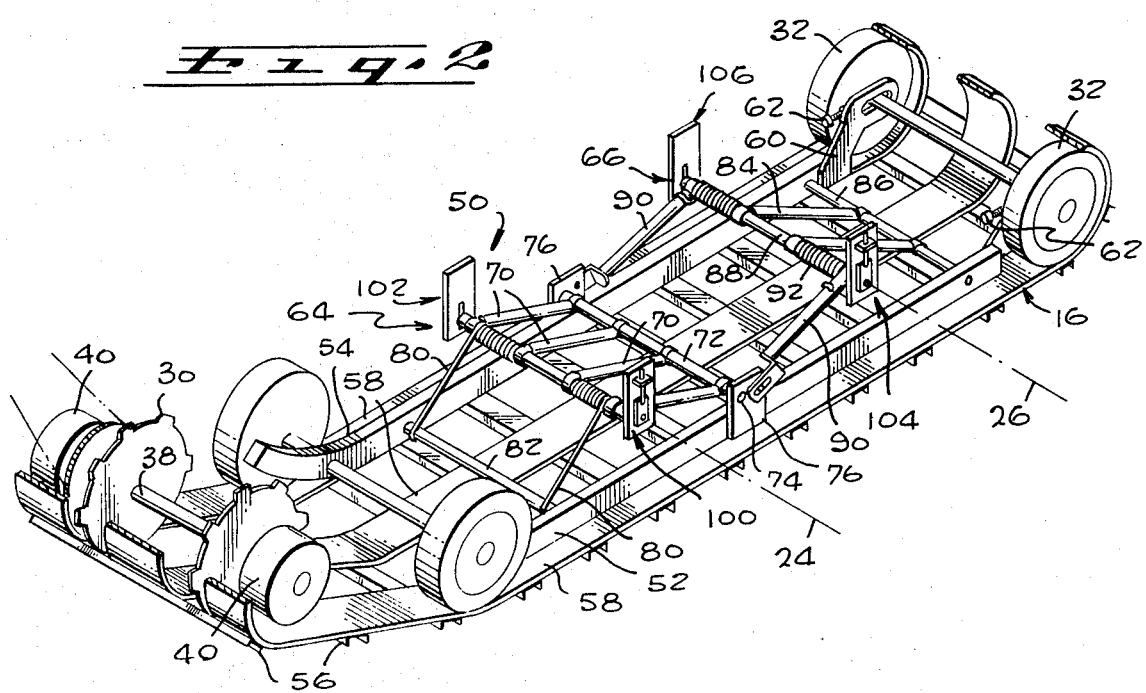

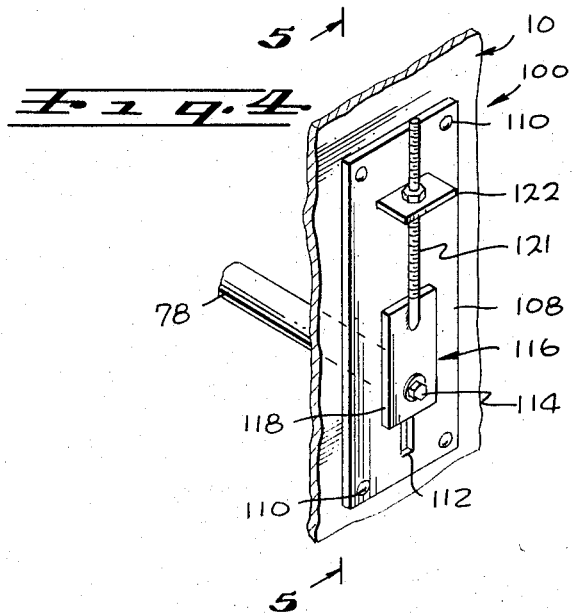
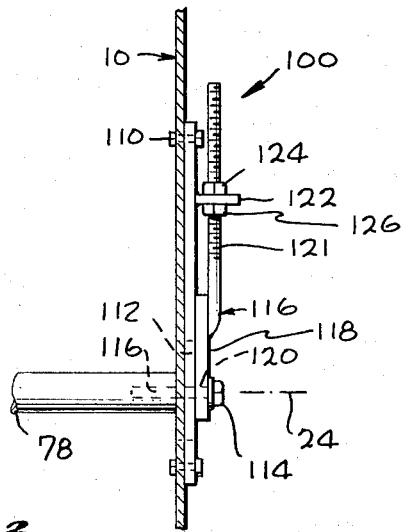
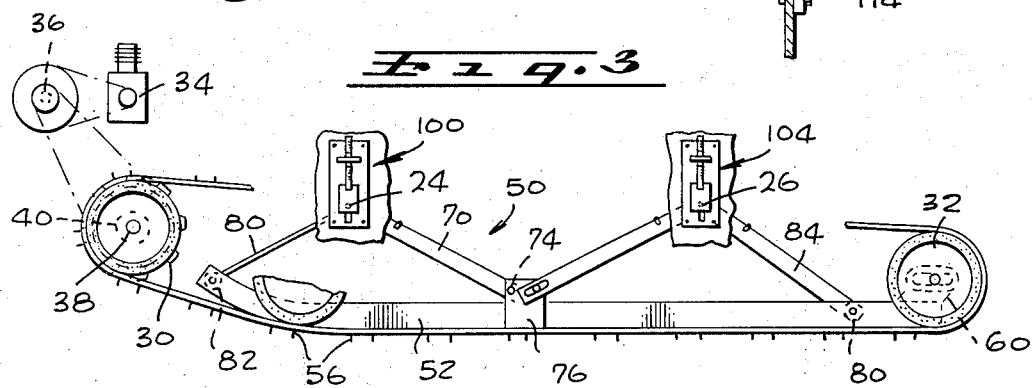
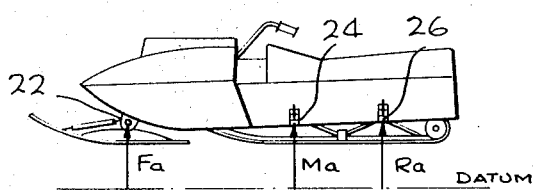
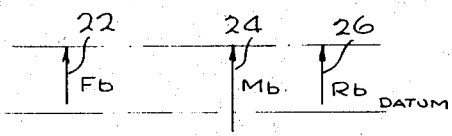
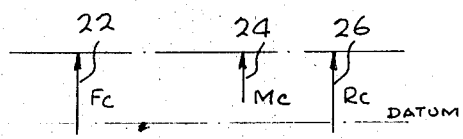
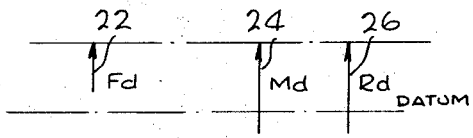

PATENTED DEC 24 1974　3,856,099

SNOWMOBILE ADJUSTABLE SUSPENSION

BACKGROUND OF THE INVENTION

This invention relates to a snowmobile of the type which includes a tank-like track along the rear for propelling the vehicle along the ground.

The most common type of snowmobile includes a chassis steered and supported at the front by skis, and driven and supported at the rear by a tank-like track. The front of the track extends around a sprocket wheel rotatably mounted on the chassis and driven by an engine. The rear of the track is free to move up and down with respect to the chassis, and the chassis is supported thereon by a pair of rails that bear against the track and that are connected through a suspension system to the chassis. The track is held under tension by idler wheels that are mounted at the rear of the rails, so the suspension system tends to press forwardly as well as upwardly on the chassis. Normally, the suspension system includes forward and rearward portions mounted at different locations on the rails and connected to different locations on the chassis, one location being forward of the other.

The riding characteristics of a snow-mobile are highly dependent upon the precise location at which the chassis is connected to the suspension system. The suspension points determine the height of the rear chassis portion above the ground, the "springiness" or ability to absorb the shock of bumps and to resist swaying around corners, and the relative proportion of weight borne by the skis and track. Different characteristics are desirable under different ground and use conditions. For example, it is desirable to raise the chassis under heavy soft snow conditions to reduce drag, while it is desirable to lower the chassis in traversing ice and hard packed snow to increase stability. Also, it is desirable to shift weight from the skis to the track when maximum acceleration is desired, but to shift weight to the skis when increased steering response is required. The suspension characteristics are generally fixed, and the fixed design is generally chosen as a compromise between the various considerations, although with a bias toward one or another characteristic for vehicles often used in a particular application such as in racing. The suspension characteristics can be altered in a variety of ways, including adjusting the spring suspension, the length of the struts that connect the rails to the chassis, and the adjustment of the mounting points where the struts mount on the rails or the chassis. Adjustment of the mounting points would be simple matter, except that any loosening at a mount point tends to cause a sudden forward shift of the strut, due to tension in the track, and it is then difficult to reapply the track tension.

SUMMARY OF THE INVENTION

In accordance with one embodiment of the present invention, an adjustable suspension system is provided for a snowmobile of the type which includes rails supported on a driven track and carrying idler wheels that keep the track in tension. The suspension system includes arms extending at an incline from the rails of the chassis and spring biased to urge the chassis upwardly, and an adjustable mount for connecting the upper ends of the arms to the chassis. Each mount includes a vertically extending slot in the chassis, a bolt extending through the slot and connected to an upper end of a suspension arm, and a screw mechanism for raising and lowering the bolt with respect to the chassis and for holding the bolt at it any position along the length of the vertical slot. The screw mechanism permits a rapid adjustment of the support height of a chassis location, the vertical slot preventing any forward shifting in spite of high track tension which tends to shift the suspension arms forwardly. An adjustment of the screw mechanism not only permits adjustment of the height of the chassis above the ground, but permits an adjustment of the proportion of weight carried by the skis as compared to the track, and an adjustment of the relative amounts of weight supported at the forward portion of the track as compared with the rearward portion.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perpsective view of a snowmobile constructed in accordance with the present inventin;

FIG. 2 is a partial perspective view of the track and suspension system of the snowmobile of FIG. 1;

FIG. 3 is a partial side elevation view of the track and suspension system of FIG. 2;

FIG. 4 is a partial perspective view of the adjusting mechanism of the suspension system of FIG. 2;

FIG. 5 is a view taken along the line 5—5 of FIG. 4;

FIG. 6A is a side elevation view of the snowmobile of FIG. 1, showing forces applied by the suspension system thereof to the chassis;

FIGS. 6B–6D illustrate how the load is transferred between different points of the chassis for different adjustments of the suspension system;

DESCRIPTION OF THE PREFERRED EMBODIMENTS

Figure 7:
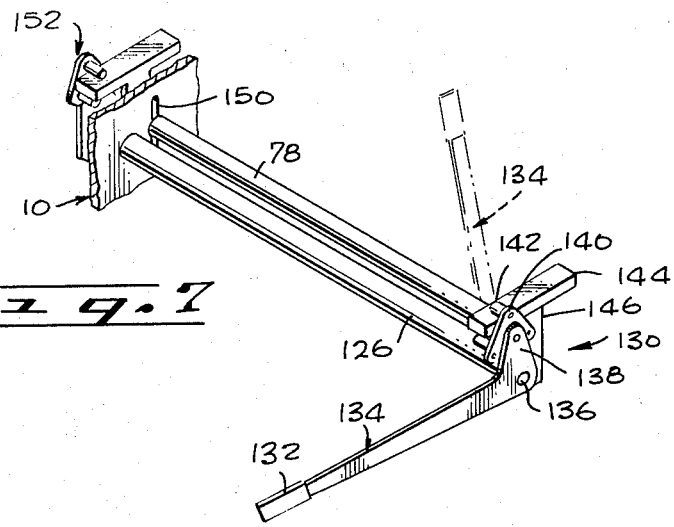
FIG. 7 is a partial perspective view of an adjusting mechanism constructed in accordance with another embodiment of the invention.

FIG. 1 illustrates a snowmobile which includes a chassis 10, a pair of skis 14 that support the front portion 10F of the chassis on the ground, and a track 16 that supports the rear portion 10R of the chassis on the ground. The chassis includes a seat 18 extending along the rear portion thereof, an engine compartment 20 at the front portion thereof, and handle bars 22 operated by a rider sitting on the seat to steer the vehicle. The chassis is suspended at three longitudinally spaced locations, these being at the front ski location 22 where the skis are attached to the chassis, and at two locations 24, 26 above the track where the chassis is supported over the track. The present invention provides means for making adjustments at these locations 24, 26 in an easily accomplished manner.

As also illustrated in FIGS. 2 and 3, the track 16 extends in an endless loop under the vehicle, between sprocket wheels 30 at the front and tension wheels 32 at the rear. An engine 34 is connected through a jack shaft 36 to a front drive shaft 38 on which the sprocket wheels 30 are mounted, so that the sprocket wheels can drive the track 16 and propel the vehicle along the ground. The drive shaft 38 is mounted by bearings 40 directly on the chassis, so that its position is fixed therealong. However, the track portions behind the sprocket wheels 30 are not fixed in position, but are connected through a suspension system 50 to the chassis so that the track can deflect upwardly to absorb shocks while still supporting much of the chassis weight.

The suspension 50 includes a pair of rails 52, 54 positioned within the loop track and bearing against the lower portion of the track. The track includes a series of cleats 56 tied to three belts 58, with the rails 52, 54 bearing directly against the cleats. The tension wheels 32 are connected by brackets 60 to the rear ends of the rails 52, 54, the brackets having slots and having adjusting bolts 62 for moving the tension wheels along the slots to adjust the tension of the belt.

The suspension system 50 includes a forward suspension part 64 which supports the chassis at 24 on the tracks 52, 54 and a rearward suspension part 66 which supports the chassis at 26 on the rails. The locations 24, 26 are axes extending laterally, or in other words along the width of the snowmobile. The forward suspension part includes a group of four arms 70 attached at their lower ends to a lower shaft 72. The lower shaft 72 is pivotally mounted at 74 on a pair of brackets 76 that are fixed to the rails 52, 54. The arms 70 extend at a low incline angle from their lower ends, and the arms have upper ends fixed to a forward shaft 78 whose axis coincides with the location 24. A pair of springs 80 extend from a bar 82 that is fixed to the rails, to the forward shaft 78. The springs 80 urge the shaft 78 upwardly to thereby urge the chassis location at 24 upwardly. The rearward suspension part 66 is similarly constructed, with arms 84 attached at their lower ends to a shaft 86 that is pivotally mounted on the rails. The arms 84 extend at a low incline angle and have upper ends attached to a rearward shaft 88 that extends along the rearward location 26. A pair of additional arms 90 have lower ends pivotally and slideably attached to the brackets 74, 76 on the rail, and have upper ends pivotally attached to the rearward shaft 88. A pair of springs 92 urge rotation of the arms 84 and 90 in a direction to raise the rearward shaft 88 and therefore to raise the chassis at the location 26.

The springs 80 and 92 urge the arms 70 and 84 to pivot in a direction to raise the chassis. The forward and rearward shafts 78, 88 therefore are urged upwardly by the spring. In addition, the force of the tension wheels 72 on the track is transmitted through the rails 52, 54 to the shafts 78, 88 to also urge them to move forwardly with respect to the chassis. Thus, any loosening of the apparatus that holds the shafts 78, 88 to the chassis to vary the height of the chassis, would ordinarily allow the shafts 78, 88 to shift forwardly. The tension of the track is usually too large for a person to resist merely by pressing with his hands, so that once the shaft mounting apparatus is loosened, it previously has not been possible for a person to easily reestablish track tension.

In accordance with the present invention, an adjustable mount mechanism is provided which permits continuous adjustment of the vertical position of chassis locations with respect to the suspension system, the mechanism serving to hold the chassis securely at any selection position while resisting any forward or rearward shifting under the forces produced by high track tension. The snowmobile is provide with four mounts, including two forward mounts 100, 102 and two rearward mounts 104, 106. The two forward mounts 100, 102 mount opposite ends of the laterally extending forward shafts 78 on the chassis. The rearward mounts 104, 106 similarly mount opposite ends of the rearward shaft 88 on the chassis.

The four mounts 100-106 are similar, and FIGS. 4 and 5 illustrate details of one of them 100. The mount 100 includes a plate 108 fixed by four screws 110 to the chassis 10, although the side plates of the chassis can be used alone. The plate has a vertically-extending slot 112, or guideway, therein. A bolt 114 is threaded into a hole 116 at the end of the forward shaft 78, and the bolt extends through the slot 112 so that the end of the forward shaft 78 is confined to vertical movement and therefore serves as a follower member moving along the slot. An adjust member 116 has a lower end 118 with a hole 120 therein through which the bolt 114 extends, and has a threaded upper end 121 which extends through a hole in a bracket 122 that is fixed to the plate 108. A nut 124 threadably engaged with the threaded upper end 121 of the adjust member and lying on the bracket 122 prevents downward movement of the adjust member and therefore determines the height of the bolt 114 and the height of the forward shaft 78. Another nut 126 is provided which can be screwed against the lower surface of the bracket 122 to lock the adjust member in place.

A person can easily adjust the height of the end of forward shaft 78 by loosening the nut 126 and then turning the nut 124 in a direction to raise or lower the adjust member 116. The adjust member then raises or lowers the bolt 114 where it connects to the forward shaft. Even during the adjustment, the shaft 78 tends to press forwardly due to tension in the track, as described above. However, the slot 114 in the plate prevents forward shifting of the bolt 114 and shaft 78, and the track tension merely increases the friction of sliding of the bolt 114 along the slot. The adjustment can be readily made by one person who operates a wrench to turn the nuts 124 and 126. In fact, the snowmobile can be resting in its normal position on the ground during the adjustment, because a wrench applied to the nuts 124, 126 sufficiently increases the leverage to permit raising of the chassis with respect to the shaft 78 as well as overcoming the tension-caused friction of the nut 114 against the walls of the slot 112. The slot 114 does not have to extend precisely vertically, but should extend with a greater vertical directional component than horizontal directional component.

The four mounts 100-106 permit a variety of adjustments of track suspension characteristics. Thus, for example, the two forward mounts 100, 102 may be adjusted to raise or lower the location or axis 24 of the shaft 78 independently of the axis 26 of the rearward shaft 66 to tilt the chassis so as to change its pitch attitude. This produces a large change in the suspension characteristics without greatly altering the height of the chassis above the ground. Another mode of adjustment involves operating all four mounts 100-104 to raise or lower both shafts 78, 88, to thereby alter the height of the rear chassis portion above the ground without producing a large change in riding characteristics. Also, one or two mounts on one side of the chassis such as mounts 100 and 104 can be adjusted independently of those on the other side in order to compensate for misalignment of the chassis, which may be due to an improper factory adjustment or to damage from a crash. In addition, if provisions are made to alter the relative height of the ski 14, one side of the rear chassis portion can be raised with respect to the other to enable the snowmobile to better negotiate the turns of a round or oval raceway.

One of the most important uses of the adjustment mounts is to provide for weight transfer. FIG. 6A shows three force arrows $F_a$, $M_a$ and $R_a$ which represent forces applied at the three longitudinally spaced suspension locations 22, 24, and 26 of the chassis where it is mounted respectively on the skis and on the forward and rearward portions of the track-to-chassis suspension apparatus. In this figure, the three forces are shown as equal. FIG. 6B illustrates the weight transfer that occurs when the mounts at one attach point 24 are adjusted to raise the chassis thereat. As a result of the adjustment at 24, the weight represented by the length of arrow $M_b$ is increased while the weight at $F_b$ and $R_b$, respectively representing the most forward and most rearward attach locations, is lowered. The positions of the arrow tips is not changed even thorugh the support points move up or down slightly, since the movements are small. All arrow lengths are indicated with respect to a Datum line that represents the original arrow lengths in FIG. 6A. The change from the configuration at 6B results in more force being borne by the track rather than the skis, which results in less slippage and therefore permits greater acceleration. Another result of the lower weight at the skis, is that the skis have less effect in steering. The greater weight at point 24 than at point 26 also changes the riding characteristics, since it produces greater pressure at the forward portion of the track than the rearward portion. However, such a change in riding characteristics is often an undesirable result of the weight shifting to the track, rather than a desired result.

FIG. 6C illustrates the result of lowering the chassis at 24 so that there is less weight thereat as represented by the length of arrow $M_c$. As a result of such lowering, weight is transferred to the points 22 and 26 at the extreme front and rear of the chassis. The transfer of weight to the ski suspension point 22 permits the skis to steer with greater effectiveness, which is desirable when negotiating a sharp curve. The increased weight at the rear location 26 changes the riding characteristics of the snowmobile. Again, this change in riding characteristics is generally not desirable if the previous weight distribution between points 24 and 26 provided a good ride.

FIG. 6D illustrates the weight transfer resulting from moving up the chassis at both points 24, 26 where the chassis is supported on the track. The main result of raising the support locations at 24 and 26 is to raise the rear of the chassis so that it rides higher above the ground, which is often desirable in traveling through deep and soft snow. Another result is that more weight is transferred to the track and therefore removed from the skis at 22, resulting in greater traction but less steering ability. The riding characteristics of the vehicle are not greatly changed because the weights $M_d$ and $F_d$ are the same at both track support locations 24, 26.

Figure 8:
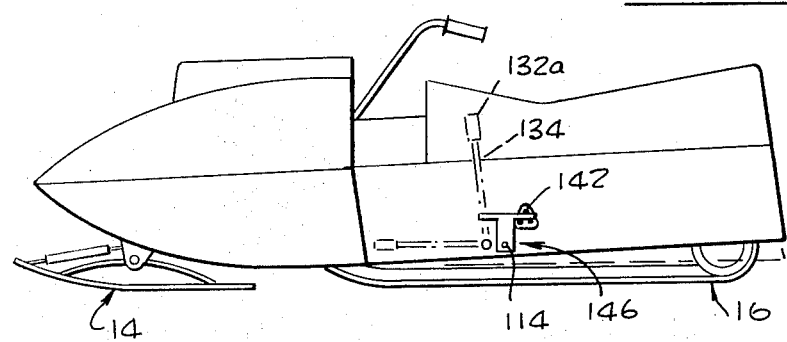
FIG. 8 is a side elevation view of the adjusting mechanism of FIG. 7, showing it in a configuration wherein the adjustable chassis location is lowered.

A rider can therefore adjust the suspension of the vehicle to account for the ground conditions, as where the ground is covered with deep snow or with ice, and also to account for peculiar travel as in drag racing where maximum traction is desirable. Where it is desirable to require a minimum of adjustment, only the front mounts 100, 102 may be adjusted or only the rear mounts 104, 106 may be adjusted. Also, only the mounts at the front (100, 102) or only those at the rear (104, 106) may be made adjustable, the other mount locations being fixed and unadjustable.

in some snowmobile journeys, it is desirable to provide for adjustment of the suspension while the snowmobile is moving along the ground. For example, in a race it is often desirable to provide maximum traction at the beginning when the vehicle must accelerate rapidly, and to provide maximum weight transfer to the skis for good steering when entering a sharp curve. FIGS. 7 and 8 illustrate a mounting mechanism 130 which permits a rider to adjust the suspension while the snowmobile is rapidly moving along the ground. The mount mechanism 130 is designed to raise and lower the front shaft 78 when the rider respectively raises and lowers a handle 132 on a lever 134. The lever 134 is attached to a shaft 136 that is pivotally mounted on the chassis 10. One end 138 of the lever opposite the handle 132, pivotally supports a bearing plate 140 which, in turn, rotatably supports three rollers 142. The rollers engage a horizontally-extending bar 144 of a support member 146. The lower ends of the support member 146 are engaged with bolts 114 that extend through vertical slots 150 in the chassis and into the ends of the forward shaft 78. When a rider lifts the handle 132 to the position 132a shown in FIG. 8, the rollers 142 move down the bar member 146 relative to the chassis, or in other words, move up the chassis with respect to the member 146.

Thus, lifting of the lever raises the chassis. Conversely, lowering of the lever 134 causes the member 146 to move up with respect to the chassis, so that the chassis moves lower to the ground. A rider can readily move the lever 134 while the snowmobile is moving along the ground, to obtain optimum suspension characteristics. For example, he may start a race with the handle in the upward position 132a in order to obtain maximum acceleration. However, he may then lower the lever to transfer weight to the skis for better steering capability. It should be noted that the movement of the lever 134 rotates the shaft 136 to operate a similar mechanism 152 at the opposite side of the chassis so that both sides of the chassis are raised and lowered together. Of course, it is possible to provide mechanisms for also manually raising and lowering the rearward shaft 88. It is also possible to utilize an electric motor or hydraulic pump to power the adjusting mechanism, although the motor or pump will normally be controlled by a manually operable member such as a button or lever that is operated by the rider.

Figure 9:
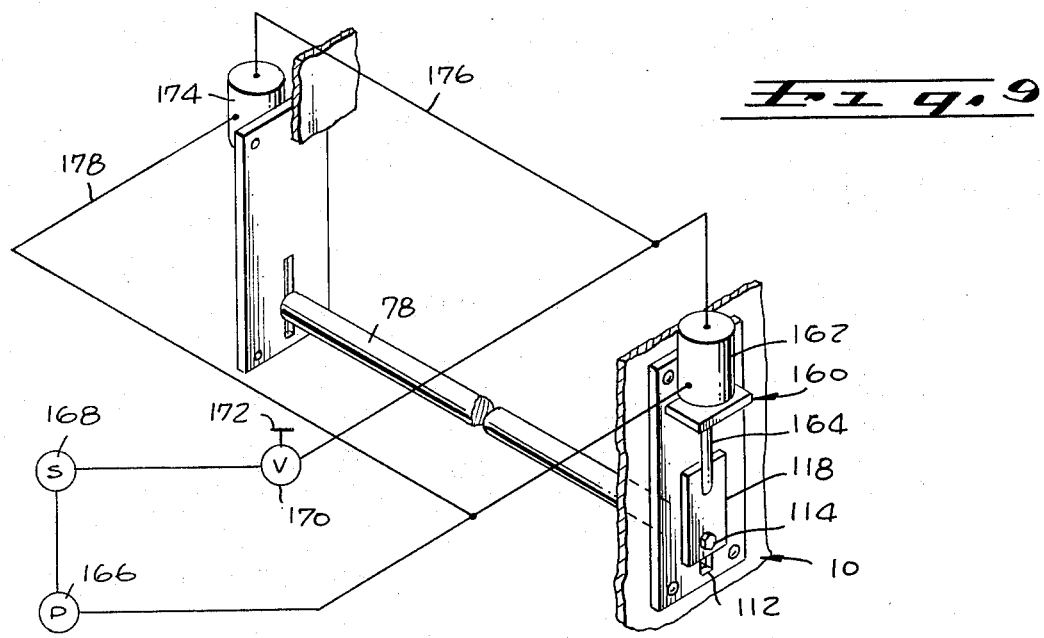
FIG. 9 is a partial perspective view of an adjusting mechanism constructed in accordance with another embodimetnt of the inventin.

FIG. 9 illustrates a hydraulic system 160 for raising and lowering the chassis. The system 160 includes a hydraulic cylinder 162 mounted on the chassis, a piston 164 extending from the cylinder to a lower end plate 118, and a bolt 114 extending through a slot 112 to the shaft 78. A hand pump 166 can be operated to raise the chassis by pump hydraulic fluid from a reservoir 168 to the cylinder. A rider can operate a valve handle 172 to open a valve 170, in order to allow hydraulic fluid to flow from the cylinder to the reservoir and thereby lower the chassis. A similar hydraulic system 174 is provided at the other side of the vehicle and connected by a line 178 to the hand pump and by a line 176 to the relief valve 170.

Thus, the invention provides a snowmobile of the type which has a track held under tension by wheels that are mounted on rails on which the chassis is supported, in which raising and lowering of the chassis support points relative to the track can be readily accomplished while the track is under tension. This is accomplished by providing mounts that are connected to upper shafts of the suspension system, in which the mounts move the shaft along substantially vertically extending guideways such as those formed by the walls of a slot. The adjust mechanism can utlize a screw device which one person can readily operate with a wrench to make adjustments in a short period of time, such as minute, or the adjust mechanism can be made operable by a rider a the snowmobile is rapidly moving along the ground.

Although particular embodiments of the invention have been described and illustrated herein, it is recognized that modifications and variations may readily occur to those skilled in the art and consequently, it is intended the claims be interpreted to cover such modifications and equivalents.

What is claimed is:

1. A snowmobile comprising:
   a chassis having a seat for holding a rider;
   ski means mounted at the front portion of the chassis for supporting the front portion thereof on the ground;
   a track drive assembly mounted at the rear portion of the chassis, including a track extending in a loop, a sprocket wheel at the front of the track loop, and a tension wheel at the rear of the track loop which holds the track under tension;
   an engine mounted on the chassis and coupled to the sprocket wheel to rotate it and thereby drive the track to move the chassis along the ground;
   a pair of laterally spaced rails disposed within the track loop and bearing against the track, said rails attached to the tension wheels so that the rails can keep the tension wheels from shifting forwardly;
   a suspension assembly for mounting the chassis on the rails and for preventing the rails from shifting forwardly, said suspension assembly having suspension arm means with lower portions connected to the rails and upper portions, and spring means urging the upper portions of the arm means upwardly with respect to the rails;
   first guide means having a primarily vertically extending guideway which extends continuously between the lowest and highest location therealong;
   second guide means engaged with said guideway and moveable continuously therealong so that relative movement is vertical, one of the guide means attached to the chassis and the other attached to the upper end of the suspension arm means so that the upper end of the suspension arms means is confined to primarily vertical movement relative to the chassis; and
   an adjustor coupled to the two guide means for holding the second guide means at selected positions along the vertical guideway of the first guide means, whereby to permit raising and lowering of the chassis while preventing uncontrolled forward shifting of the rails to thereby keep the track under tension.

2. The snowmobile described in claim 1 wherein:
   said first guide means includes a pair of plates on laterally opposite sides of the chassis, each plate having a primarily vertically-extending slot therein;
   said second guide means includes a pair of follower members extending through the slots of the plates and coupled to the upper end of the suspension arm means; and
   said adjustor includes a screw adjust member and nut adjust member on each side of the chassis, one of the adjust members coupled to the plate to be supported by it and the other coupled to the follower member and threadably engaged with the other adjust member.

3. In a snowmobile which has a chassis supported along its rear portion by a spring suspension which includes an arm assembly that has a lower end supported on a track, the improvement comprising:
   a plate on either side of the chassis, each plate having a vertically-extending slot;
   a pair of follower members mounted on the arm assembly, each follower member extending through the slot of a different one of said plates; and
   a pair of adjustors, each located at a different side of the chassis, each adjustor having a pair of threadably engaged members respectively engaged with the plate and follower at the corresponding side of the chassis to permit a continual adjustment of the height of the chassis.

4. A snowmobile comprising:
   a chassis having a seat for holding a rider;
   ski means mounted at the front portion of the chassis for supporting the front portion thereof on the ground;
   a track drive assembly mounted at the rear portion of the chassis, including a track extending in a loop, a sprocket wheel at the front of the track loop, and a tension wheel at the rear of the track loop which holds the track under tension;
   an engine mounted on the chassis and coupled to the sprocket wheel to rotate it and thereby drive the track to move the chassis along the ground;
   a pair of laterally spaced rails disposed within the track loop and bearing against the track, said rails attached to the tension wheels so that the rails can keep the tension wheels from shifting forwardly;
   a suspension assembly for mounting the chassis on the rails and for preventing the rails from shifting forwardly, said suspension assembly having suspension arm means with lower portions connected to the rails and upper portions, and spring means urging the upper portions of the arm means upwardly with respect to the rails;
   first guide means having a primarily vertically extending guideway;
   second guide means engaged with said guideway and moveable therealong so that relative movement is vertical, one of the guide means attached to the chassis and the other attached to the upper end of the suspension arm means so that the upper end of the suspension arms means is confined to primarily vertical movement relative to the chassis;

an adjustor coupled to the two guide means for holding the second guide means at selected positions along the vertical guideway of the first guide means, whereby to permit raising and and lowering of the chassis while preventing uncontrolled forward shifting of the rails to thereby keep the track under tension; and a manual control member mounted on said chassis and easily accessible and operable by a rider on said seat while the snowmobile is moving along the ground, said control member coupled to the adjustor to operate it to raise and lower the second guide means.

* * * * *